US012079394B2

(12) United States Patent
Tomasescu

(10) Patent No.: US 12,079,394 B2
(45) Date of Patent: Sep. 3, 2024

(54) INTERACTIVE CONTACTLESS ORDERING TERMINAL

(71) Applicant: AKSOR, Saint-Thibault-des-Vignes (FR)

(72) Inventor: Daniel Tomasescu, Saint-Thibault-des-Vignes (FR)

(73) Assignee: AKSOR, Saint-Thibault-des-Vignes (FR)

( * ) Notice: Subject to any disclaimer, the term of this patent is extended or adjusted under 35 U.S.C. 154(b) by 0 days.

(21) Appl. No.: 17/069,958

(22) Filed: Oct. 14, 2020

(65) Prior Publication Data
US 2022/0113807 A1     Apr. 14, 2022

(51) Int. Cl.
*G06F 3/01*     (2006.01)
*G06F 3/03*     (2006.01)
(Continued)

(52) U.S. Cl.
CPC .............. G06F 3/017 (2013.01); G06F 3/011 (2013.01); G06F 3/0304 (2013.01); G06F 3/04883 (2013.01); G06F 9/451 (2018.02); G06Q 50/12 (2013.01); *G06F 3/04186* (2019.05); *G06F 2203/04101* (2013.01); *G06F 2203/04801* (2013.01); *G06Q 20/18* (2013.01);
(Continued)

(58) Field of Classification Search
CPC ...... G06F 3/017; G06F 9/451; G06F 3/04883; G06F 3/011; G06F 3/0304; G06F 3/04186; G06F 2203/04101; G06F 2203/04801; G06Q 50/12; G06Q 20/18; G06Q 30/0641; G07F 9/006; G07F 9/009
See application file for complete search history.

(56) References Cited

U.S. PATENT DOCUMENTS 5,731,801 A * 3/1998 Fukuzaki .............. G06F 3/0488
715/842
5,801,696 A * 9/1998 Roberts ................... G06F 9/451
715/781
(Continued)

FOREIGN PATENT DOCUMENTS

EP     3742370 A1    11/2020
FR     2934741 A1    2/2010
(Continued)

OTHER PUBLICATIONS

Search Report in European Patent Application No. 20306208, mailed Mar. 30, 2021.

*Primary Examiner* — Justin R. Blaufeld
(74) *Attorney, Agent, or Firm* — Harness, Dickey & Pierce PLC

(57) ABSTRACT

An interactive electronic device includes a display module designed to display a graphical interface on a display surface, a detection module designed to determine a position of a user interaction element in a preset detection module volume and a processing module suitable for controlling the interactive electronic device as a function of the determined position of the interaction element according to at least a first operating mode. In the first mode of operation, a projected surface, corresponding to the orthogonal projection of the preset detection volume on the plane including the display surface, is offset from the display surface of the graphical interface.

21 Claims, 6 Drawing Sheets

(51) Int. Cl.
*G06F 3/04883* (2022.01)
*G06F 9/451* (2018.01)
*G06Q 50/12* (2012.01)
G06F 3/041 (2006.01)
G06Q 20/18 (2012.01)
G06Q 30/0601 (2023.01)
G07F 9/00 (2006.01)

(52) U.S. Cl.
CPC ......... *G06Q 30/0641* (2013.01); *G07F 9/006* (2013.01); *G07F 9/009* (2020.05)

(56) References Cited

U.S. PATENT DOCUMENTS

| | | | | |
|---|---|---|---|---|
| 6,142,910 | A * | 11/2000 | Heuvelman | A63B 24/00 482/4 |
| 9,383,895 | B1 * | 7/2016 | Vinayak | G06F 3/04883 |
| 9,746,919 | B2 * | 8/2017 | Seta | G06F 3/013 |
| 9,785,284 | B2 * | 10/2017 | Sandblad | G06F 3/04883 |
| 9,817,570 | B2 * | 11/2017 | Bostick | G06F 3/0238 |
| 2003/0043174 | A1 * | 3/2003 | Hinckley | G06F 3/04883 345/684 |
| 2004/0032398 | A1 * | 2/2004 | Ariel | G06F 3/0426 345/156 |
| 2004/0108990 | A1 * | 6/2004 | Lieberman | G07F 7/1041 345/156 |
| 2004/0150630 | A1 * | 8/2004 | Hinckley | G06F 3/04855 345/173 |
| 2007/0211023 | A1 * | 9/2007 | Boillot | G06F 3/04886 345/156 |
| 2009/0313125 | A1 * | 12/2009 | Roh | G07F 9/02 345/173 |
| 2010/0067181 | A1 * | 3/2010 | Bair | G06F 1/1616 348/744 |
| 2010/0107099 | A1 * | 4/2010 | Frazier | G06F 3/0445 715/764 |
| 2010/0188342 | A1 * | 7/2010 | Dunn | G06F 3/04886 715/810 |
| 2010/0259561 | A1 * | 10/2010 | Forutanpour | G06F 3/0238 345/173 |
| 2011/0093362 | A1 * | 4/2011 | Boston | G06Q 30/0641 710/33 |
| 2011/0148926 | A1 * | 6/2011 | Koo | H04N 21/4316 345/157 |
| 2011/0193939 | A1 * | 8/2011 | Vassigh | G06F 3/011 348/169 |
| 2012/0013613 | A1 * | 1/2012 | Vesely | H04N 13/30 345/419 |
| 2012/0038542 | A1 * | 2/2012 | Miyashita | G06F 3/0485 345/7 |
| 2012/0038592 | A1 * | 2/2012 | Shyu | G03B 17/54 345/175 |
| 2012/0113151 | A1 * | 5/2012 | Nakano | G06F 3/005 345/682 |
| 2012/0162204 | A1 * | 6/2012 | Vesely | G06F 3/0325 345/419 |
| 2012/0229411 | A1 * | 9/2012 | Arai | G06F 3/04817 345/173 |
| 2012/0306748 | A1 * | 12/2012 | Fleizach | G06F 3/0485 345/161 |
| 2013/0100020 | A1 * | 4/2013 | Salsman | G06F 3/042 345/158 |
| 2013/0181904 | A1 * | 7/2013 | Murase | G06F 3/005 345/168 |
| 2013/0252691 | A1 * | 9/2013 | Alexopoulos | A63F 13/428 463/17 |
| 2013/0285933 | A1 * | 10/2013 | Sim | G06F 3/04883 345/173 |
| 2013/0314380 | A1 * | 11/2013 | Kuribayashi | G06F 3/0425 345/175 |
| 2013/0339908 | A1 * | 12/2013 | Bailey | G06F 3/0484 715/863 |
| 2014/0109022 | A1 * | 4/2014 | Wei | G06F 3/017 715/863 |
| 2014/0176499 | A1 * | 6/2014 | Westerman | G06F 3/04845 345/174 |
| 2014/0204063 | A1 * | 7/2014 | Kaida | G06F 3/0393 345/184 |
| 2014/0331189 | A1 | 11/2014 | Lee et al. | |
| 2015/0169051 | A1 * | 6/2015 | Seta | G06F 3/011 345/156 |
| 2015/0169134 | A1 * | 6/2015 | Givon | G06F 3/0426 345/175 |
| 2015/0206257 | A1 * | 7/2015 | Harada | G06F 16/783 382/103 |
| 2015/0363070 | A1 * | 12/2015 | Katz | G06F 3/04815 715/852 |
| 2016/0027231 | A1 * | 1/2016 | Guzzone | G07F 9/0235 705/16 |
| 2016/0070466 | A1 * | 3/2016 | Chaudhri | G06F 3/04883 715/765 |
| 2016/0073073 | A1 * | 3/2016 | Ha | H04N 9/3173 353/28 |
| 2016/0154577 | A1 * | 6/2016 | Lehtiniemi | G06F 3/04847 715/716 |
| 2016/0291747 | A1 * | 10/2016 | Fischer | G06F 3/1446 |
| 2017/0038928 | A1 * | 2/2017 | Park | G06V 40/10 |
| 2017/0108998 | A1 * | 4/2017 | Van Der Westhuizen | G06F 3/0488 |
| 2017/0153712 | A1 * | 6/2017 | Kawai | G06F 3/0482 |
| 2017/0269771 | A1 * | 9/2017 | Nam | G06F 3/0416 |
| 2017/0329513 | A1 * | 11/2017 | Young | G06F 3/04883 |
| 2018/0218561 | A1 * | 8/2018 | Oldroyd | G07F 9/001 |
| 2018/0267762 | A1 * | 9/2018 | Aurongzeb | G06F 3/042 |
| 2019/0064931 | A1 * | 2/2019 | Park | G06F 3/0304 |
| 2019/0102830 | A1 * | 4/2019 | Yin | G06Q 20/3276 |
| 2019/0172297 | A1 * | 6/2019 | Schwarber | G07F 9/0235 |
| 2020/0193358 | A1 * | 6/2020 | Vick | G06F 3/017 |
| 2020/0233572 | A1 * | 7/2020 | Healy | G06F 3/0416 |
| 2020/0374945 | A1 | 11/2020 | Denolle | |
| 2021/0365915 | A1 * | 11/2021 | Kaufman | G06Q 20/203 |
| 2021/0395070 | A1 * | 12/2021 | Sankaran | G05B 19/4155 |
| 2022/0033242 | A1 * | 2/2022 | Zubarik | G06Q 30/0633 |

FOREIGN PATENT DOCUMENTS

| | | | |
|---|---|---|---|
| FR | 3070225 | A1 | 2/2019 |
| JP | 08006705 | A * | 1/1996 |
| JP | 2000089884 | A * | 3/2000 |
| JP | 2001117684 | A * | 4/2001 |
| WO | WO-2018/178066 | A1 | 10/2018 |

* cited by examiner

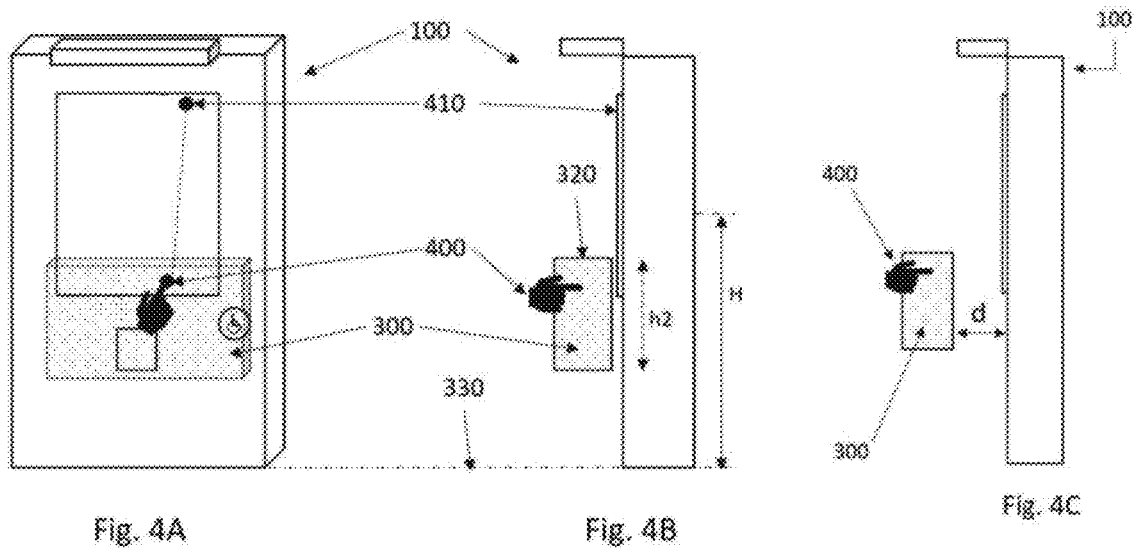

INTERACTIVE CONTACTLESS ORDERING TERMINAL

FIELD

The present invention relates to the field of electronic devices for human-machine interaction. The present invention finds applications in the field of interactive kiosks for sales or customer information. It more particularly finds applications in the field of interactive contactless ordering terminals, used, for example, at points of sale or restaurants.

BACKGROUND

The use of interactive touch-screen ordering kiosks is known to increase customer comfort and experience while speeding up consumer flows during peak hours in stores, particularly in fast food outlets. The use of interactive kiosks also makes it possible to offer an elaborate and personalized ordering process that has the effect of improving the experience and the average basket.

However, the use of touch screens poses at least two problems. First a problem of hygiene, and then a problem of ergonomics.

The use of a touch screen poses a hygiene problem, with each user of the interactive ordering terminal touching the screen with their fingers, possibly depositing germs on the screen that could contaminate another user of the interactive ordering terminal.

The use of a touch screen also poses an ergonomic problem. In fact, the touch screen of an interactive ordering terminal is generally placed high, putting it out of reach of small users, for example a child, or a user in a wheelchair.

There is therefore a need to improve electronic human-machine interaction devices. The present invention falls within this context

SUMMARY

The present invention relates to an interactive electronic device comprising:
- a display module designed to display a graphical interface on a screen surface or on several screens,
- a detection module suitable for determining the position of a user interaction element in a first preset detection volume, and,
- a processing module designed to control the interactive electronic device according to the determined position of the interaction element according to a first mode of operation.

In the first mode of operation, a first projected surface corresponding to an orthogonal projection of the first preset detection volume on a plane comprising the screen is offset from the surface of the screen.

Advantageously, a user of the interactive electronic device may interact with the graphical interface without having to touch the screen and by means of an interaction element, for example a finger, which may be moved in an offset volume, for example downwards relative to the screen. Thus, it is possible to interact with the graphical interface even though the top of the screen is too high to be accessible to a user.

According to a complementary embodiment, the first preset detection volume is remote from the screen along an axis orthogonal to said screen.

Similarly, a user may interact with the interactive electronic device while being at a distance from the interactive electronic device.

According to a complementary embodiment, the detection module is suitable for determining the position of the user interaction element in a second preset detection volume, the processing module being suitable for controlling the interactive electronic device as a function of the determined position of the interaction element according to a second operating mode, and, in the second operating mode, the projected surface corresponding to the orthogonal projection of the second preset detection volume on a plane comprising the surface of the screen.

According to a complementary embodiment, at least one dimension, the length or width, of the first projected surface is less than the same dimension of the second projected surface.

According to a complementary embodiment, the first projected surface corresponds to a homothety of the second projected surface.

According to a complementary embodiment, the graphical interface comprises a cursor making it possible to interact with at least one object of the graphical interface, the processing module being designed to control the cursor of the graphical interface as a function of the position of the interaction element determined by the detection module.

According to a complementary embodiment, in the first mode of operation, the interactive electronic device is suitable for:
- recording a first and a second determined position of the interaction element,
- determining, as a function of the first and second determined position of the interaction element, a parameter associated with the movement of the interaction element between the first and the second position, and,
- if this parameter exceeds a preset threshold, then triggering of a cursor action in the graphical interface.

According to a complementary embodiment, the interactive electronic device is suitable for:
- periodically recording a determined position of the interaction element in a "fifo" type queue comprising "n" records, "n" being greater than or equal to two, the $n^{th}$ record in the queue corresponding to the last record in the queue of a determined position,
- determining, after each recording, as a function of the first and of the $n^{th}$ recording of the determined position of the interaction element, a parameter associated with the movement of the interaction element between the first and the $n^{th}$ position determined, and,
- if this parameter exceeds a preset threshold, then triggering of a cursor action in the graphical interface.

According to a complementary embodiment, the interactive electronic device comprises a switching module designed to cause switching between the first operating mode and at least the second operating mode According to a complementary embodiment, the switching module comprises a graphic element, the first and the second projected surface comprise the graphic element, while the processing module is designed to cause switching between the first mode of operation and at least the second mode of operation when the projection of the determined position of the interaction element on the plane comprising the screen is included, for a predetermined duration, in the graphic element.

According to a complementary embodiment, when the interactive electronic device is installed for use by users, said users being located in front of the interactive electronic device, the distance between the upper face of the preset detection volume and the ground in front of the interactive electronic device is less than a predetermined distance.

The invention also relates to an interactive ordering terminal, the interactive ordering terminal being an interactive electronic device according to the present description.

The invention also relates to a method of controlling an interactive electronic device, the interactive electronic device comprising a display module designed to display a graphical interface on a surface of a screen, the method comprising the steps of:
- determining, by a detection module of the interactive electronic device, the position of a user interaction element in a first preset detection volume,
- controlling, by a processing module of the interactive electronic device, said interactive electronic device according to the determined position of the interaction element according to a first operating mode, in this first mode of operation, a first projected surface corresponding to an orthogonal projection of the first preset detection volume on a plane comprising the screen being offset from the surface of the screen.

DRAWINGS

FIGS. 1A and 1B illustrate an interactive electronic device according to one embodiment of the invention, in a perspective view (FIG. 1A) and a side view (FIG. 1B).

FIGS. 2A, 2C and 2C more particularly illustrate a detection volume of the interactive electronic device in an operating mode, according to a perspective view (FIG. 2A), a profile view (FIG. 2B) and a sectional view (FIG. 2C).

FIGS. 4A, 4B and 4C illustrate more particularly a detection volume of the interactive electronic device in said other mode of operation.

Figure 5:
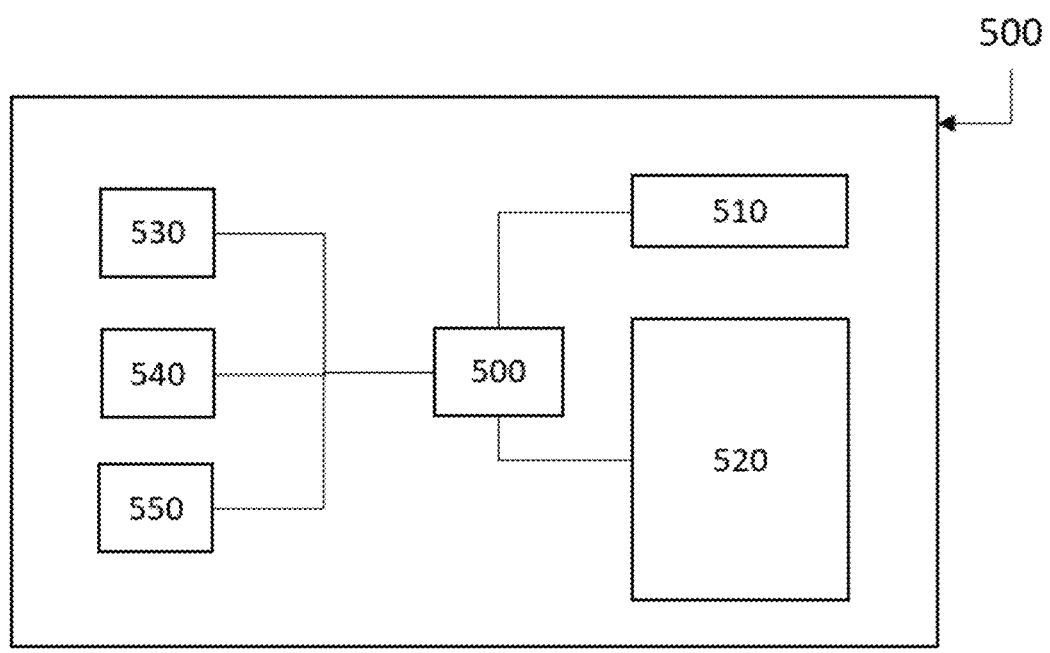

FIG. 5 schematically illustrates the hardware architecture of an interactive electronic device according to one embodiment of the invention.

Figure 6:
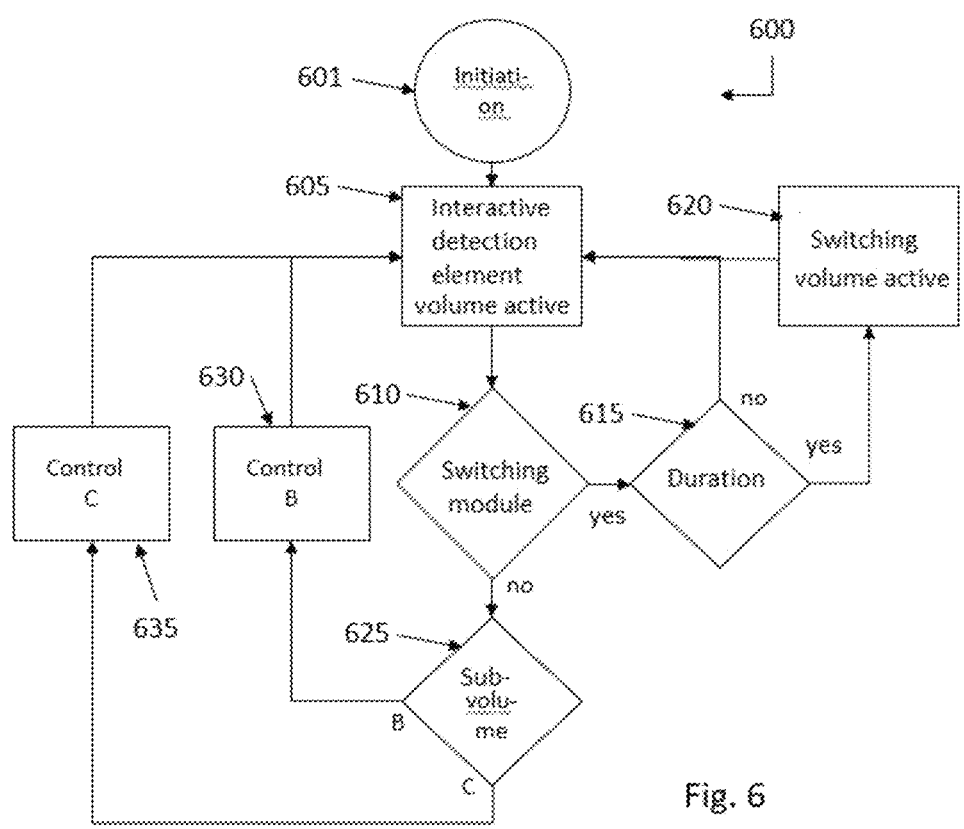

FIG. 6 illustrates the steps of a method implemented by an interactive electronic device according to one embodiment of the invention.

DETAILED DESCRIPTION

Figures 1A, 1B:
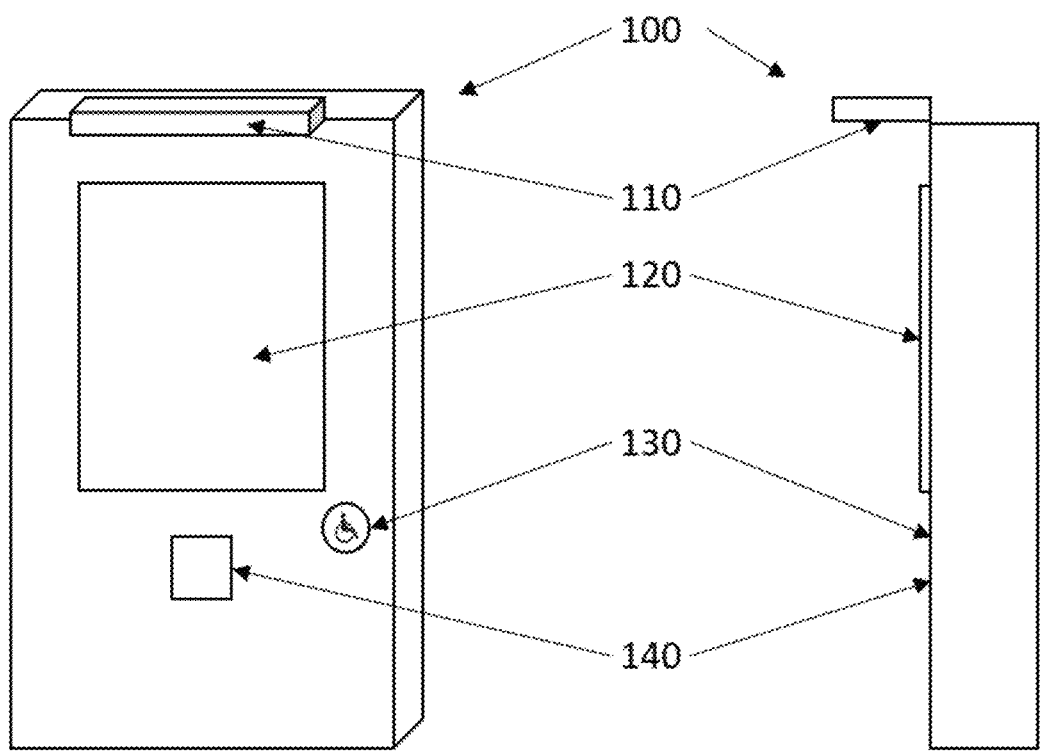

FIG. 1, more particularly FIGS. 1A and 1B, illustrate an interactive electronic device 100. The interactive electronic device 100 is, for example, an interactive control, recording or information terminal 100 designed to allow, for example, customers to obtain information or to place an order themselves at a point of sale such as a restaurant or a cinema. An interactive ordering, registration or information kiosk refers to a device otherwise called, for example, "ordering kiosk", "registration kiosk", "information kiosk" or "self-service kiosk". An interactive ordering, registration or information kiosk, for example, allows restaurant customers to browse a menu, make their choice and pay for their order. An interactive ordering terminal is generally interconnected to an order management system making it possible, once an order has been entered and possibly paid for by a user of the interactive order terminal, to manage the preparation and/or delivery of the order.

The interactive electronic device or interactive ordering terminal 100 comprises:
- a display module suitable for displaying a graphical interface on a surface of one or more screens 120,
- a detection module 110 suitable for determining the position of a user interaction element in a preset detection volume, and,
- a processing module (not shown) suitable for controlling the interactive electronic device 100 as a function of the determined position of the interaction element according to at least one operating mode.

The interactive electronic device 100 may further comprise one or more modules 140. The module 140 may be a payment terminal, a printer, a scanner, an NFC (Near Field Communication) reader, a Bluetooth module allowing the connection of peripheral devices such as a smartphone or RFID (Radio Frequency IDentification), etc. The module 140 may be a distributor of a localization device in order to be able to serve users in their places once their order has been placed via the interactive electronic device 100.

The interactive electronic device 100 may comprise a switching module 130, designed to cause a switching between several operating modes of the interactive electronic device 100 as explained below.

According to one embodiment of the invention, the switching module 130 comprises a graphic element. The graphic element may be a sticker attached to the interactive electronic device near the screen 120. The graphic element is attached visibly to a user of the interactive electronic device 100. According to one embodiment of the invention, the graphic element may be integrated into the graphical interface displayed on the screen 120.

The detection module 110 may be placed above the screen 120, in order to easily detect the presence of a user interaction element placed in front of the screen 120. The interaction element may be the user's hand or finger, or any object manipulated by the user.

The detection module 110 may also be placed on the sides or the bottom of the interactive electronic device 100. The detection module 100 may be placed at any place allowing said detection module 100 to determine the positioning of an interaction element used by a user of the interactive electronic device 100.

The detection module 110 is designed to detect the position of an interaction element placed in the field of view of said detection module 110. The detection module 110 may be a 3D camera. The term "3D camera" may denote an image capture device suitable for capturing so-called "three-dimensional" (3D) images. The term "3D camera" may also denote a device suitable for capturing two-dimensional images incorporating a distance from each point of the image to the device (range imaging). It may, for example, be a video camera comprising a module suitable for determining a distance to the filmed objects, for example via an ultrasound sensor, the image from the video camera being enriched with distance information. It may also be a camera comprising at least two objectives, allowing binocular vision in order to reconstruct a 3D image. Alternatively, or in a complementary manner, the detection module 110 may comprise ultrasonic or laser sensors suitable for detecting the position of an object placed in its field of vision. The detection module 110 may, for example, comprise a module for detection and estimation of the distance using light or laser, otherwise known as LIDAR (Light Detection And Ranging). The detection module 110 may, for example, comprise a module for detecting and estimating the distance by sound or ultrasound wave ("sonar" for Sound Navigation And Ranging).

The detection module 100 is designed to determine a relative position of the interaction element with respect to the interactive electronic device 100, i.e., for example, with respect to the surface of the screen 120.

The detection module 100 may be designed to determine a speed or an acceleration of the interaction element. The detection module 100 may also be designed to determine a component along, for example, a direction orthogonal, parallel or longitudinal to the surface of the screen 120 of the speed or acceleration of the interaction element.

The interactive electronic device 100 is generally designed to be used by a user in a standing position and placed in front of the interactive electronic device 110. Thus, the display module 120 is arranged so as to display the graphical interface in a visible manner for such a user of the interactive electronic device 100 in a standing position.

A user of the interactive electronic device 100 may thus interact with the graphical interface displayed on the screen 120, without any contact, via the detection module 110. Thus, the user uses his hand, a finger or any other interaction element, to navigate in the graphical interface displayed by the display module 120. For this, the user places his hand, or his finger, in the field of vision of the detection module 110.

More precisely, a detection volume of the detection module 110 is preset, the preset detection volume corresponding to a determined part, spatially limited, of the field of view of the detection module 110. This preset detection volume corresponds to a spatially limited area in which the detection of an interaction element—for example a hand or a finger of a user—is taken into account. In other words, an element detected by the detection module 110 outside the preset detection volume is ignored by the detection module 110 and does not allow interaction with the interactive electronic device 100.

An interaction element may, for example, be a stylus or any other object manipulated by a user of the interactive electronic device 100, or any part of the user's body. More generally, the interaction element may designate anything that may be detected by the detection module 110.

The detection volume may be defined as comprising the volume in front of the screen 120 on which the graphical interface is displayed. For a rectangular screen 120, the detection volume may comprise a rectangular parallelepiped whose base is the screen 120. The definition of a detection volume makes it possible to connect—or put in correspondence—each point of a surface of this detection volume with each point of the graphical interface. The surface mapped to the graphical interface is a surface facing a user of the interactive electronic device, i.e. the base of the rectangular parallelepiped.

Thus, a projected surface corresponding to the orthogonal projection of the preset detection volume on a plane comprising the screen 120 comprises the surface of the screen 120.

According to one embodiment of the invention, the preset detection volume, comprising the volume in front of the screen 120 on which the graphical interface is displayed, may be extended in order to cover other surfaces of the interactive electronic device 100, such as, for example, a zone comprising the switching module 130 (as illustrated below in FIG. 2A). Thus, the switching module 130 may consist only of a simple sticker, representing a position on the surface of the interactive electronic device 100. The interaction with the switching module 130 is then managed by the detection module 110.

Figure 2A:
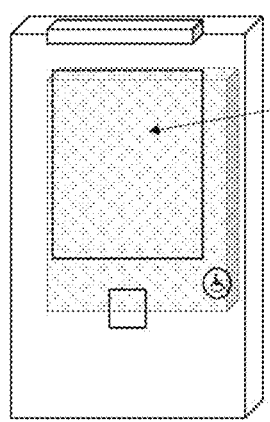
Figure 2B:
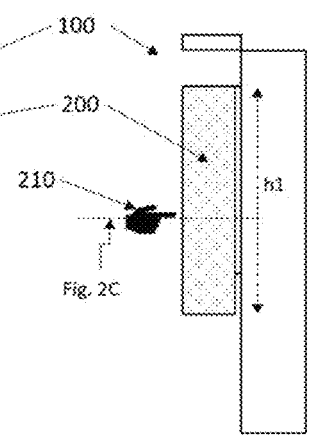
Figure 2C:
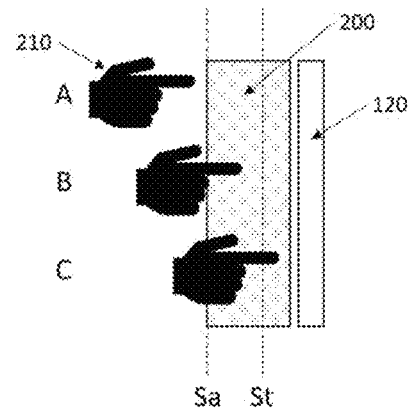

FIG. 2, more particularly FIGS. 2A, 2B and 2C, illustrates the interactive electronic device 100 of FIG. 1, a preset detection volume 200 being illustrated in dotted lines. This preset detection volume 200 is purely logical and is not a tangible element, it is shown here for illustration only. As illustrated in FIG. 2A, the preset detection volume 200 in this example faces the screen 120 and the switching module 130. Thus, the graphical interface and the switching module 130 may be controlled by a user, at the same time by means of an interaction element, via the detection module 110.

According to the embodiment of FIG. 2A, the screen 120 of the interactive electronic device 100 comprises a rectangular display surface. The preset detection volume 200 is a rectangular parallelepiped, extended in order to cover the switching module 130. The depth or thickness of the preset detection volume 200, i.e. its dimension along the orthogonal axis on the screen 120, depends on the detection module 110. This thickness is of sufficient size for a user to be able to easily interact with the graphical interface by means of an interaction element, for example a finger. This thickness is equal, for example, to ten centimeters.

As described above and illustrated in FIG. 2A, the projected surface corresponding to the orthogonal projection of the preset detection volume 200 on a plane including the screen 120 comprises the surface of the screen 120.

FIG. 2B, which is a side view of the interactive electronic device 100 illustrated in FIGS. 1 and 2A, illustrates an example of the positioning of an interaction element 210 designed to interact with the interactive electronic device 100, the interaction element 210 may be a hand or a finger of a user standing in front of the interactive electronic device 100.

FIG. 2C is a top view of the horizontal section shown by dotted lines in FIG. 2B. The interaction element 210 is shown in three different positions A, B and C relative to the preset detection volume 200.

The interaction element at position A is outside the preset detection volume 200, it is therefore ignored by the processing module of the interactive electronic device 100, the user cannot interact with the interactive ordering terminal 100.

The interaction element at position B or C is included in the preset detection volume 200, the user may interact with the interactive ordering terminal 100. In the event that the thickness of the detection volume 200 is measured from the surface of the screen 200, the detection volume 200 being, according to this embodiment, flush with the surface of the screen 200, then the positions A, B and C differ in that:

In position A, the interaction element is located at more than a distance Sa from the screen 120, i.e. outside the detection volume 200, the thickness of the latter being precisely Sa;

In position B, the interaction element is located less than a distance Sa from the screen 120, but more than a distance Sb from the screen 120, the distance Sb making it possible to define a separation plane of the detection volume 200 in two sub-volumes, the interaction element is in the first detection sub-volume;

In position C, the interaction element is located at less than a distance Sb from the screen 120, the interaction element is in the second detection sub-volume.

According to one embodiment, the detection of an interaction element at a position B or C makes it possible to locate a cursor on the graphical interface, the activation of an object on the graphical interface being able to take place by pointing at this object for a predetermined time.

According to another embodiment, the preset detection volume 200 comprises at least a first and a second preset detection sub-volume separated by a plane parallel to the display surface of the screen 120, each preset detection sub-volume being associated with a cursor control in the graphical interface. The processing module is then designed to control the cursor of the graphical interface as a function of the determined position of the interaction element in one or other of the preset detection sub-volumes, each sub-volume of detection being associated with a cursor control in the graphical interface. In this embodiment, position B corresponds to an interaction element in a first preset detection sub-volume while position C corresponds to an interaction element in a second preset detection sub-volume.

According to this other embodiment, the first preset detection sub-volume is associated with a pointer positioning control in the graphical interface while the second preset detection sub-volume is associated with an action control of the pointer in the graphical interface. In other words, the detection of the interaction element 210 in the first detection sub-volume may allow movement of the cursor in the graphical interface or the selection of an object in the graphical interface. The selection of an object may be associated with a visual effect on the graphical interface (highlighting of the object for example). The detection of the interaction element 210 in the second detection sub-volume may make it possible to activate a graphical interface object on which the cursor is positioned, for example previously selected.

Thus, the passage of the interaction element 210 from the first detection sub-volume to the second detection sub-volume allows a "click" in the graphical interface. The definition of two detection sub-volumes thus allows an intuitiveness of the activation gesture (or "click") of a graphical interface object (selection/validation of a choice in a menu, for example) for a user of the interactive electronic device 100, the gesture reproducing a gesture of pressing towards on the screen of the display module 120 (but without it being necessary to touch the screen).

In the case where the preset detection volume 200 is attached to the screen of the display module 120, the first and second detection sub-volumes of the preset detection volume 200 may be defined by the quantities "Sa" and "St":

"Sa" corresponds to the maximum distance between an interaction element 210 facing the screen and the display surface of the display module 120 so that this interaction element is detected, i.e. so that it is within the preset detection volume 200, "St" corresponds to the distance between the separation between the first detection sub-volume and second detection sub-volume and the display surface of the display module 120.

According to another embodiment, the preset detection volume 200 does not include a detection sub-volume. The detection module 100 is designed to determine a speed or an acceleration of the interaction element. The detection module 100 may also be designed to determine a component along, for example, a direction orthogonal, parallel or longitudinal to the surface of the screen 120 of the speed or acceleration of the interaction element.

Thus, the interactive electronic device is suitable for:
recording a first determined position and a second determined position of the interaction element,
determining, as a function of the first and second determined position of the interaction element, a parameter associated with the movement of the interaction element between the first and the second position, and, if this parameter exceeds a preset threshold, then triggering a cursor action in the graphical interface.

In other words, the interactive electronic device records two successive determined positions of the interaction element. The interactive electronic device then determines, as a function of these two positions, or possibly only according to the components of these two positions determined along, for example, the direction orthogonal, parallel or longitudinal to the surface of the screen 120, a parameter associated with the movement of the interaction element between the first and the second position. This parameter may correspond to a speed or an acceleration between these two positions.

In this embodiment, the determined position of the interaction element allows control of the positioning of the pointer in the graphical interface. The action control of the pointer in the graphical interface (i.e. "a click") is performed based on the determined speed or acceleration of the interaction element. Possibly, the action control of the pointer in the graphical interface is carried out as a function of a component, for example in a direction orthogonal, parallel or longitudinal to the surface of the screen 120, of the determined speed or acceleration of the interaction element. Thus, a user may perform a click or a scroll in the graphical interface when the determined speed or acceleration of the interaction element exceeds a preset threshold, possibly in a direction orthogonal or parallel to the surface of the screen 120.

The interactive electronic device may periodically record a new determined position, and store the previous determined position in the memory. The determination of the parameter associated with the movement of the interaction element is carried out after each recording of a new position, possibly provided that a previously determined position is recorded. Thus, if no determined position has already been recorded, the interactive electronic device does not determine a parameter associated with the movement of the interaction element. In fact, this would otherwise result in a determination of an outlier parameter.

According to one embodiment of the invention, each determined position is associated with a position (x, y, z) in an orthogonal frame of reference comprising a Y axis orthogonal to the surface of the screen 120, the "y" coordinate corresponding to a coordinate along this Y axis. In this case, the determination of the parameter associated with the movement of the interaction element between the first and the second position may consist of a calculation of a difference between each "y" coordinate of the two positions determined along the Y axis, possibly divided by a predetermined value. This predetermined value may be determined as a function of the time elapsed between the first and the second position.

In addition, the interactive electronic device is suitable for:
periodically recording a determined position of the interaction element in a "fifo" type queue comprising "n" records, "n" being greater than or equal to two, the nth record of the queue corresponding to the last record from a determined position,
determining, after each recording, as a function of the first and of the nth recording of the determined position of the interaction element, a parameter associated with the movement of the interaction element between the first and the nth position determined, and, if this parameter exceeds a preset threshold, then triggering a cursor action in the graphical interface. Possibly, then, the interactive electronic device erases the "n" records in the queue.

In other words, the interactive electronic device is suitable for recording a succession of determined positions in a "fifo" type queue ("first in, first out"; i.e. the first elements arriving in the queue are the first to leave), recording may be performed periodically, a predetermined time between each position. The determination of the parameter associated with the movement of the interaction element between the first and the nth determined position is carried out by a calculation performed on the first and last value of the queue, and this, for example, after each recording of a new position in the queue. The calculation may consist, for example, in determining the distance between the two positions. If after this calculation, the threshold is not exceeded, a new position is recorded in the queue, and a new calculation is performed. If after a calculation the threshold is exceeded, then the interactive electronic device triggers a cursor action in the graphical interface, or, in other words, performs a "click" at the cursor position in the graphical interface. The queue may then be reset to zero, the various values of the stored positions being reset to zero. Clearing the queue after detecting a "click" avoids the detection of an untimely succession of "clicks".

The advantage of recording several determined positions in a queue is to allow a faster reaction time, the interactive electronic device performing n calculations for a movement between two positions making it possible to exceed the threshold, the interactive electronic device therefore reacts in a queue approximately equal to the predetermined time between the n records.

Possibly, the determination of the parameter associated with the movement of the interaction element between the first and the nth determined position is carried out only if there are, In fact, n determined positions recorded in the "fifo" file. Without this precaution, if the "fifo" queue is pre-filled with "default" values (for example, the value of "zero" by default), the determination of the parameter would give rise to an outlier parameter.

According to one embodiment, the "fifo" queue may record fifteen determined positions (n equals fifteen). The recording of a determined position may be carried out synchronously with the refreshing of the screen 120 or of the graphical interface. The recording of a determined position may be carried out periodically, at a predetermined time interval. The preset threshold may be determined based on the length of the predetermined time interval. Alternatively, when determining the parameter associated with the movement of the interaction element between the first and the nth determined position, the calculation may include a step of dividing by a value depending upon the predetermined time interval, possibly a square root of the value as a function of the time interval. The value depending on the predetermined time interval may also depend on the length n of the "fifo" queue.

In a complementary manner, the value of the preset threshold making it possible to define a "click" may be variable according to the last position determined in the detection area. For example, the value of the preset threshold may be defined inversely proportional to the distance between the last determined position, possibly its component along a vertical axis, and the detection module 110.

Stated otherwise, unlike the previous embodiment, in which a user could perform a "click" by approaching the interaction element of the screen surface 120 below a predetermined threshold, in this implementation mode, it is the speed or acceleration of the interaction element, possibly in a direction orthogonal to the surface of the screen 120, when a preset threshold is exceeded, which triggers the "click".

In addition to the various embodiments described, the user interface may include a display element, the display element indicating for example:
 a determined distance between the interaction element and the surface of the screen 120;
 the determined speed of the interaction element, and/or,
 the determined acceleration of the interaction element.

Possibly, the display element may comprise an additional indication to indicate the value of a single predetermined threshold, for example the predetermined threshold of activation ("click"). The indication may consist of a change in shape or color of a graphic element.

The display of the distance determined between the interaction element and the surface of the screen 120 may be in the form of a circle or disc of variable diameter around the cursor, the diameter being a function of the determined distance. The diameter may be, for example, proportional to the determined distance. Thus, the closer a user brings the interaction element to the screen surface 120, the more the circle displayed around the cursor tightens around the cursor.

What has been explained above makes it possible to solve the hygiene problem posed by the use of a touch screen on an interactive ordering terminal or interactive electronic device. Thus, the use of a detection module such as a 3D camera with an interactive ordering terminal 100, according to the embodiments described above, makes it possible to obtain an interactive ordering terminal or an interactive contactless electronic device. It should be noted, however, that it is possible to modify an interactive ordering terminal comprising a touch screen by adding a detection module, for example a 3D camera, the interactive ordering terminal thus modified to be able to operate in a tactile and/or contactless manner.

FIG. 3 illustrates another aspect of the invention. According to this aspect of the invention, the interactive electronic device 100 comprises at least a first mode of operation and a second mode of operation.

The first mode of operation is associated with a first preset detection volume 300 illustrated in FIG. 3.

The second operating mode is associated with the preset detection volume 200, as previously described in FIG. 2.

The interactive electronic device is designed to be able to switch between one or the other of the at least two operating modes.

Thus, the interactive electronic device 100 comprises:
 the display module designed to display the graphical interface on the screen surface 120,
 the detection module 110 designed to determine a position of an interaction element of a user in a first preset detection volume 300, and,
 the processing module designed to control the interactive electronic device 100 according to the determined position of the interaction element according to the first mode of operation.

In the first mode of operation, a first projected surface corresponding to the orthogonal projection of the first preset detection volume 300 on the plane comprising the screen 120 is offset from the surface of the screen 120.

In other words, the first preset detection volume 300, or at least the first projected surface corresponding to the orthogonal projection of the first preset detection volume 300 on the plane comprising the screen 120, does not entirely cover the surface of the screen 120, or even does not cover it at all.

The offset may be downwards, with the first preset detection volume 300 being lower than the screen 120.

The first projected surface corresponding to the orthogonal projection of the preset detection volume 300 on the plane comprising the screen 120 may be offset with respect to the screen 120. According to the embodiment illustrated in FIG. 3, the first projected surface is offset downwards and to the right relative to the screen 120.

Switching between two operating modes may be performed upon detection of an interaction element in a predetermined area of the active detection volume for a predetermined time. The term "active preset detection volume" is understood to mean the first or second preset detection volume according to the operating mode of the interactive electronic device 100. In other words, the active preset detection volume is the preset detection volume 200 in the second operating mode or the preset detection volume 300 in the first operating mode of the interactive electronic device 100.

The switching between the first and the second operating mode may be performed by positioning an interaction element facing the switching module 130. The switching may then be performed after expiration of a predetermined time as long as the interaction element remains detected in front of the switching module 130. An indication may be displayed on the screen indicating the time remaining before the actual switching. The switching may be automatic after activation of the switching module 130, for example by activating the switching module 130 (position "C" in FIG. 2C of an interaction element positioned in front of the switching module 130).

The interactive electronic device 100 may include a switching module 130 designed to cause switching between several operating modes, as explained below. Said switching module 130 may include a sticker representing a position on the interactive electronic device 100. According to another embodiment of the invention, the switching module 130 may be a switch-type button.

More generally, the switching module 130 may include a graphic element, this graphic element being comprised in the first and second projected surface corresponding to the projections of the preset detection volumes 200 and 300 on a plane comprising the screen 120.

Thus, the processing module may be designed to cause switching between the first operating mode and at least the second operating mode when the projection of the determined position of the interaction element on the plane comprising the screen is included, for a predetermined time, in the graphic element of the switching module 130.

Figures 3A, 3B:
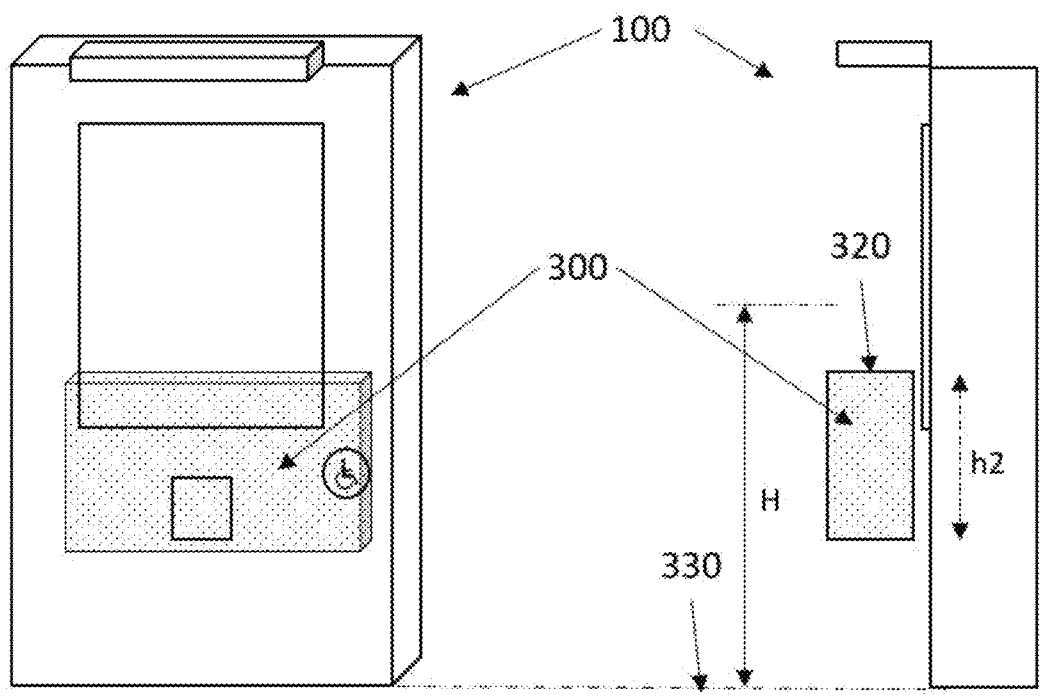
FIGS. 3A and 3B illustrate more particularly a detection volume of the interactive electronic device in another mode of operation, in a perspective view (FIG. 3A) and a profile view (FIG. 3B).

The second preset detection volume 300 is, for example, designed to be accessible to a user in a wheelchair. Thus, according to certain standards covering the accessibility of equipment to people in wheelchairs, the equipment must be placed at a maximum height H determined from the ground, H being, for example, 1m40. The second preset detection volume 300 may thus be entirely disposed under this height H as illustrated in FIGS. 3A and 3B. In other words, the second preset detection volume 300 is located entirely below the predetermined height H, H being measured from the ground 330, in order to ensure accessibility of the interactive electronic device 100 to wheelchair users.

Stated still differently, when the interactive electronic device 100 is installed for use by users, said users being located in front of the interactive electronic device 100, the distance between the upper face 320 of the preset detection volume 300 and the ground 330 in front of the interactive electronic device is less than a predetermined distance H.

The second preset detection volume 300 may correspond to a translation of the preset detection volume 200 in a direction parallel to the surface of the screen 120. For example, the second preset detection volume 300 may correspond to a lowering of the preset detection volume 200. In this case, the upper face 320 of the second preset detection volume 300 is closer to the ground than the upper face of the first preset detection volume 200.

The second preset detection volume 300 may correspond to a translation, homothety, rotation, and/or any other combination of transformations of the preset detection volume 200.

In other words, the first projected surface corresponding to the orthogonal projection of the preset detection volume 300 on the plane comprising the screen 120 may correspond to a translation, homothety, rotation, and/or any other combination of transformations of the second projected surface corresponding to the orthogonal projection of the preset detection volume 200 on the plane comprising the screen 120.

According to one embodiment of the invention, at least one dimension, the length or width, of the first projected surface is less than the same dimension of the second projected surface. Thus, for example, the length or height h2 of the first projected surface, as illustrated in FIG. 3B, is less than the length or height h1 of the second projected surface, as illustrated in FIG. 2B. In other words, at least one dimension of the preset detection volume 300 may be reduced compared to the same dimension of the preset detection volume 200.

More generally, the projected surface corresponding to the orthogonal projection of the preset detection volume 200 or 300 on the plane comprising the screen 120 may correspond to a translation, homothety, rotation, and/or any other combination of transformations of the 'screen 120.

The second preset detection volume 300 may thus be of different dimensions from those of the first preset detection volume 200. This may be the case if this second preset detection volume 300 must meet the constraint of being entirely under the height H and that the height of the screen is close to, or even greater than, the height H. The height of the first preset detection volume 300 may then be reduced relative to that of the second preset detection volume 200. A detected position of an interaction element in the second preset detection volume 300 may make it possible to determine proportionally to the reduction in height achieved, a position of a pointer or cursor in the graphical interface.

The processing module is designed to achieve a correspondence between a determined position of an interaction element and a point of the graphical interface. Regardless of the size of each preset detection volume, at any point in the graphical interface, there is a possible position of the interaction element within each predetermined detection volume.

Thus, the first projected surface corresponding to the orthogonal projection of the preset detection volume 300 on the plane comprising the screen 120 may have a reduced height compared to the height of the screen 120.

The second preset detection volume 300 may be expanded to cover the switching module 130. Thus, the switching module 130 may be used through the detection module 110 in the second mode of operation. In this case, in the first operating mode, only part of the first preset detection volume 300 makes it possible to navigate in the graphical interface of the interactive ordering terminal 100, in a manner similar to the second operating mode illustrated in FIGS. 1 and 2.

According to a complementary embodiment of the invention, the first preset detection volume 300 is moved away from the screen 120 along an axis orthogonal to the screen 120 in order to bring said detection volume closer to a user of the interactive electronic device 100 located in front of said interactive electronic device 100. In fact, a user in a wheelchair cannot necessarily approach the interactive electronic device 100 as close as a user without a wheelchair. The first preset detection volume 300 may then be brought closer to the position of the wheelchair user in order to facilitate the use of the interactive electronic device 100.

FIGS. 4A, 4B and 4C illustrate the use of an interactive electronic device 100 in the second mode of operation. An interaction element 400 (identical to the interaction element 210) corresponds to the hand or finger of a user of the interactive ordering terminal 100, the user being in a wheelchair. The relatively lower height of the first preset detection volume 300 of the first mode of operation compared to the height of the second preset detection volume 200 of the second mode of operation facilitates its use by this user. Thus, the position of the interaction element 400 shown in FIG. 4A or 4B allows the user, in the first mode of operation, to reach a point 410 located at the height of the graphical interface. Comparatively, this same position of the interaction element 400 would correspond, in the second mode of operation, only to a low point of the second preset detection volume 200 and, therefore, would not allow access to the top of the graphical interface. The fact of having offset the first preset detection volume 300 lower relative to the second preset detection volume 200 therefore allows a user positioned lower, because for example seated in a wheelchair, to reach all the positions of the preset detection volume 300, and consequently to be able to navigate in the entire graphical interface.

According to one embodiment of the invention, in the first and/or second mode of operation of the interactive electronic device 100, the graphical interface comprises a cursor making it possible to interact with at least one object of the graphical interface, the processing module being suitable for controlling the cursor of the graphical interface as a function of the determined position of the interaction element 400.

More specifically, according to one embodiment of the invention, the processing module of the interactive electronic device 100 is designed to control the cursor of the graphical interface as a function of the position determined by the detection module 100 of the interaction element 400:
  in the first preset detection volume 300 when the interactive electronic device 100 is in the first operating mode,
  in the second preset detection volume 200 when the interactive electronic device 100 is in the second operating mode.

Thus, the processing module is suitable for associating with a detected position of an interaction element 400 in one or other of the detection volumes 200 or 300, depending on the operating mode of the interactive electronic device 100, a cursor position in the graphical interface.

The processing module comprises, for each detection volume, a correspondence table or a correspondence algorithm making it possible to determine a position of the cursor in the graphical interface from a detected position—given by the detection module 110—an interaction element 400 within a preset detection volume.

The detected position may be expressed as a position relative to a predetermined reference point of each preset detection volume.

FIG. 5 schematically illustrates the hardware architecture of an interactive electronic device 100 according to one embodiment of the invention.

The interactive electronic device 100 comprises a processing module 500, which may comprise a central unit. The processing module 500 may be a central computer unit, comprising a microprocessor, random access memory, a storage unit, and input/output interfaces. The processing module 500 is the processing module of the interactive electronic device 100 described previously in the description of the preceding figures.

The processing module 500 is connected to a display module 520. The display module 520 is designed to display a graphical interface on a screen, this screen being the screen 120 previously described. The display module 520 may comprise a screen, touchscreen or not. The display module 500 may be a projector suitable for projecting an image onto a remote screen, the projected image defining a display surface of the displayed graphical interface.

The processing module 500 is connected to a detection module 510. The detection module 510 may be a 3D camera or any other pointing device capable of detecting the position of an interaction element. The detection module 510 may be placed in any place making it possible to have in its field of vision a front zone of the interactive electronic device 100, particularly the zone in front of the display surface of the display module 520. The detection module 510 may be advantageously placed above the interactive ordering terminal 100 overhanging the display module 520. The detection module 510 is the detection module 110 described above.

According to one embodiment, the interactive electronic device 100 comprises at least two modes of operation, the detection module 510 being designed to orient or move in order to modify the orientation of its field of vision. Thus, the detection module 510 may adapt its orientation or its position in order to define a second preset detection volume potentially distant from a first preset detection volume.

The module 530, 540 or 550 may be a payment terminal, a printer, a scanner, an NFC (Near Field Communication) or RFID (Radio Frequency IDentification) reader, etc. The module 530, 540 or 550 may be a distributor of a localization device in order to be able to serve the user in his place once his order has been placed via the interactive electronic device 100. One of these modules 530, 540 and 550 may be the switching module 130 previously described if the latter is of the switch or control button type.

According to an alternative embodiment of the invention, the interactive electronic device 100 comprises only one operating mode, the detection module 110 being associated with a single preset detection volume 300 as illustrated in FIG. 3.

FIG. 6 illustrates the steps of a method implemented by an interactive electronic device according to one embodiment of the invention. The steps of the method are carried out by the processing module 500, relying on the detection module 110, 510 and possibly on the switching module 130 for certain steps.

Step 601 is an initialization step of the interactive electronic device 100, following, for example, a power-up of the interactive electronic device 100. The interactive electronic device 100 powers up in a preset default operating mode, the default operating mode corresponding to the first or second operating mode previously described.

The rest of the method is described with the assumption that the default operating mode is the second operating mode. The active preset detection volume is therefore the second preset detection volume 200.

Step 605 corresponds to the detection by the detection module 110 of an interaction element in the active detection volume. The detection module 110 then determines a position of the interaction element within the active preset detection volume.

In a step 610, the interactive electronic device 100 determines whether the position of the interaction element corresponds to a graphic element of the switching module 130. According to one embodiment of the invention, the processing module 500 determines whether the projection of the determined position of the interaction element on the plane including the screen is included in the graphic element of the tilt module 130.

If yes, in a step 615, the processing module 500 determines whether the projection of the determined position of the interaction element on the plane comprising the screen is included in the graphic element of the switching module 130 at least for a preset period. In other words, the processing module 500 verifies that the position of the interaction element is maintained at least for a predetermined time. This is not the case if the user moves the interaction element significantly. Possibly, a message may be displayed during this time in the graphical interface to alert the user of the upcoming operating mode switchover, and a count of the time remaining before the switchover may also be displayed.

If the interaction element is not maintained in its position facing the graphic element, then the interactive electronic device 100 returns to step 605 awaiting detection of a new position of the interaction element.

If the interaction element is held in its position for a time greater than a predetermined time, then the processing module 500 proceeds to step 620.

As an alternative to a step 615 based on waiting for a predetermined time to validate the switchover, and according to another embodiment of the invention, step 615 may consist of verifying the passage from the position of the interaction element from the first detection sub-volume to the second detection sub-volume.

In step 620, the processing module 500 performs the switching of the operating mode of the interactive electronic device 100. If the active operating mode was the first operating mode, then the processing module 500 switches the interactive electronic device to the second operating mode and vice versa. Once the switchover is complete, the interactive electronic device 100 returns to step 605, the active preset detection volume now being the second preset detection volume if the first detection volume was previously active, and vice versa.

If, in step 610, the processing module 500 determines that the interaction element is not facing the graphic element, then the processing module 500 proceeds to step 625.

In step 625, the processing module 500 determines in which detection sub-volume the interaction element is located.

If the interaction element is in position B of FIG. 2C, i.e. in the first detection sub-volume of the active preset detection volume, then the processing module 500 switches to step 630.

If the interaction element is in position C of FIG. 2C, i.e. in the second detection sub-volume of the active preset detection volume, then the processing module 500 switches to step 635.

In step 630, the processing module controls the cursor of the graphical interface based on the determined position of the interaction element, the cursor control being associated with the first detection sub-volume. For example, this could correspond to a positioning control, or positioning of the cursor in the graphical interface or to a selection of an object.

In step 635, the processing module controls the cursor of the graphical interface based on the determined position of the interaction element, the cursor control being associated with the second detection sub-volume. For example, this could correspond to an action control—or activation—of the cursor in the graphical interface or to an activation of an object. By activation, we mean carrying out an action associated with the object (opening a selected file, validating a choice, etc.). The action may be a "click" usually performed by means of a mouse button.

Following steps 360 and 635, the processing module returns to step 605, awaiting a new determination by the detection module 110 of an interaction element in the active detection space.

According to the embodiment of the invention, steps 310 and 325 may be reversed, or even performed simultaneously.

Concretely, the invention may be implemented in an interactive restaurant ordering terminal. A user in a wheelchair may thus switch the operating mode of the terminal in order to lower the detection volume and thus make it accessible to a seated user.

The invention claimed is:

1. An interactive electronic device comprising:
(a) a kiosk-mounted display configured to display a graphical interface on a screen surface, the graphical interface being contactless, said screen surface defining a plane;
(b) a detector configured to contactlessly determine a position of a user interaction element;
(c) a switch configured to switch the detector:
from a first operating mode into a second operating mode and discontinuing the first operating mode, or
from a second operating mode into a first operating mode and discontinuing the second operating mode;
in the first operating mode, the detector is configured to contactlessly determine a first position of the user interaction element in a first preset detection volume that has a first projected surface corresponding to a first orthogonal projection of the first preset detection volume onto a plane comprising but offset from the screen surface, wherein the first projected surface does not entirely cover the screen surface, said first preset detection volume comprising a switch position;
in the second operating mode, the detector is configured to contactlessly determine a second position of the user interaction element in a second preset detection volume that has a second projected surface corresponding to a second orthogonal projection of the second preset detection volume in the plane, the second projected surface being different than the first projected surface and including the screen surface, said second preset detection volume comprising the switch position;
(d) a processor configured to:
(i) control the interactive electronic device according to the first operating mode,
in response to the user interaction element being in the switch position, control the switch to:
switch the detector from the first operating mode into the second operating mode, and control the interactive electronic device to discontinue the first operating mode and enter the second operating mode, and
control the interactive electronic device according to the second operating mode;

or
(ii) control the interactive electronic device according to the second operating mode,
in response to the user interaction element being in the switch position, control the switch to:
switch the detector from the second operating mode into the first operating mode, and
control the interactive electronic device to discontinue the second operating mode and enter the first operating mode, and control the interactive electronic device according to the first operating mode.

2. The interactive electronic device according to claim 1, wherein the first preset detection volume is remote from the screen surface along an axis orthogonal from the screen surface.

3. The interactive electronic device according to claim 1, wherein at least one dimension, a length or width, of the first projected surface is less than the same dimension of a second projected surface.

4. The interactive electronic device according to claim 3, wherein the first projected surface corresponds to a homothety of the second projected surface.

5. The interactive electronic device according to claim 1, wherein the graphical interface comprises a cursor making it possible to interact with at least one object of the graphical interface, the processor controlling the cursor of the graphical interface as a function of the position of the user interaction element determined by the detector.

6. The interactive electronic device according to claim 5, wherein, in the first operating mode, the interactive electronic device is configured to:
record a first and a second position of the user interaction element;
calculate, according to the first and second position of the user interaction element, a parameter associated with a movement of the user interaction element between the first and the second position; and
if this parameter exceeds a preset threshold, then triggering a cursor action in the graphical interface.

7. The interactive electronic device according to claim 5, wherein the interactive electronic device is configured to:
periodically record a determined position of the user interaction element in a "fifo" queue comprising "n" records, "n" being greater than or equal to two, an $n^{th}$ record of the queue corresponding to a last record in the queue of the determined position;
calculate, after each recording, as a function of the first record and the nth record of the determined position of the user interaction element, a parameter associated with a movement of the user interaction element between a first and an $n^{th}$ determined position; and
if this parameter exceeds a preset threshold, then trigger a cursor action in the graphical interface.

8. The interactive electronic device according to claim 1, wherein:
the switch comprises a graphic element;
the first projected surface and a second projected surface correspond to the graphic element; and
the processor is configured to switch between the first operating mode and at least the second operating mode when the projection of the first position of the user interaction element on the plane comprising a screen surface is included, for a predetermined period, in the graphic element.

9. The interactive electronic device according to claim 1, wherein, when the interactive electronic device is installed for use by users, the users are located in front of the interactive electronic device, and a distance between an upper face of the first preset detection volume and a ground in front of the interactive electronic device is less than a predetermined distance.

10. The interactive electronic device according to claim 1, wherein:
the display, the processor and the detector are part of a contactless and point-of-sale terminal of a restaurant-kiosk which comprises at least one of: a printer, a peripheral user smartphone connection, or peripheral user identification connection;
the detector comprises at least one of: a 3D user image capture camera, a user image capture light sensor, or a user image capture sound wave sensor; and
the graphical interface ignores the user interaction element when the interaction element is outside the first preset detection volume such that the user cannot cause an order interaction.

11. The interactive electronic device according to claim 1, wherein in the first operating mode, the first projected surface and the screen surface are not offset along an axis orthogonal from the screen surface, and, upon a graphical user interaction, a detection volume is moved away from the screen surface, to allow accessibility at a wheelchair user height.

12. An interactive ordering system for use in a restaurant, the system comprising a contactless and interactive ordering restaurant terminal comprising:
(a) a kiosk-mounted display displaying a graphical interface on a screen surface, said screen surface defining a plane;
(b) a camera or sensor configured to three-dimensionally contactlessly determine a first position of a user interaction element
(c) a switch configured to switch the detector:
from a first operating mode into a second operating mode and discontinuing the first operating mode, or
from a second operating mode into a first operating mode and discontinuing the second operating mode:
in the first operating mode, the camera or sensor is configured to contactlessly determine a first position of the user interaction element in a first preset detection volume that has a first projected surface corresponding to a first orthogonal projection of the first preset detection volume onto a plane comprising but offset from the screen surface, wherein the first projected surface does not entirely cover the screen surface, said first preset detection volume comprising a switch position;
in the second operating mode, the camera or sensor is configured to contactlessly determine a second position of the user interaction element in a second preset detection volume that has a second projected surface corresponding to a second orthogonal projection of the second preset detection volume in the plane, the second projected surface being different than the first projected surface and including the screen surface, said second preset detection volume comprising the switch position;
(d) a controller configured to:
(i) control the interactive ordering restaurant terminal according to the first operating mode,
in response to the user interaction element being in the switch position, control the switch to:
switch the camera or sensor from the first operating mode into the second operating mode, and control the interactive electronic device to discontinue the first operating mode and enter the second operating mode, and control the interactive ordering restaurant according to the second operating mode;

or (ii) control the interactive ordering restaurant terminal according to the second operating mode, in response to the user interaction element being in the switch position, control the switch to:

switch the camera or sensor from the second operating mode into the first operating mode, and control the interactive ordering restaurant terminal to discontinue the second operating mode and enter the first operating mode, and control the interactive ordering restaurant terminal according to the first operating mode;

(e) the graphical interface being contactless without having to touch the screen surface when a top of the screen surface is too high for wheelchair user access.

13. The interactive ordering system according to claim 12, wherein the first preset detection volume is remote from the screen surface along an axis orthogonal from the screen surface, and the first projected surface does not cover entirely the screen surface.

14. The interactive ordering system according to claim 12, wherein at least one length or width dimension of the first projected surface is less than the same dimension of a second projected surface.

15. The interactive ordering system according to claim 4, wherein the first projected surface corresponds to a homothety of a second projected surface.

16. The interactive ordering system according to claim 12, wherein the graphical interface comprises a cursor configured to interact with at least one object of the graphical interface, the controller controlling the cursor of the graphical interface as a function of a first position of the user interaction element determined by the camera or sensor.

17. The interactive ordering system according to claim 16, wherein, in the first operating mode, the interactive ordering system is configured to:

record the first position and a second position of the user interaction element;

calculate, according to the first and second positions of the user interaction element, a parameter associated with a movement of the user interaction element between the first and the second positions; and if the parameter exceeds a preset threshold, then trigger a cursor action in the graphical interface.

18. A method of controlling an interactive electronic device, the interactive electronic device comprising a kiosk-mounted display displaying a graphical interface on a screen surface, the method comprising:

(a) determining a first position of a user interaction element in a first preset detection volume relative to a restaurant menu;

(b) controlling the interactive electronic device according to the first position of the user interaction element to enter a first operating mode;

(c) in the first operating mode, generating a first projected surface corresponding to a first orthogonal projection of the first preset detection volume in a plane and offset from the screen surface, and the first projected surface not covering entirely the screen surface and displaying the restaurant menu at the screen surface;

(d) determining a second position of the user interaction element in a second preset detection volume, said second preset detection volume different than the first preset detection volume;

(e) controlling the interactive electronic device according to the second position of the user interaction element to enter a second operating mode and discontinue the first operating mode;

(f) in the second operating mode, generating a second projected surface corresponding to a second orthogonal projection of the second preset detection volume in the plane and the second projected surface including at least the screen surface displaying the restaurant menu, the first preset detection volume shifted downward from the second preset detection volume;

(c) switching from a first operating mode into a second operating mode and discontinuing the first operating mode, or from a second operating mode into a first operating mode and discontinuing the second operating mode, (i) in the first operating mode, the camera or sensor contactlessly determining a first position of the user interaction element in a first preset detection volume that has a first projected surface corresponding to a first orthogonal projection of the first preset detection volume onto a plane comprising but offset from the screen surface, wherein the first projected surface does not entirely cover the screen surface, the first preset detection volume comprising a switch position;

(ii) in the second operating mode, the camera or sensor contactlessly determining a second position of the user interaction element in a second preset detection volume that has a second projected surface corresponding to a second orthogonal projection of the second preset detection volume in the plane, the second projected surface being different than the first projected surface and including the screen surface, the second preset detection volume comprising the switch position:

(d) controlling:

(i) the kiosk-mounted display according to the first operating mode, in response to the user interaction element being in the switch position, switching:

the camera or the sensor from the first operating mode into the second operating mode, and the kiosk-mounted display to discontinue the first operating mode and enter the second operating mode, and the kiosk-mounted display according to the second operating mode;

or (ii) the kiosk-mounted display according to the second operating mode, in response to the user interaction element being in the switch position, switching:

the camera or the sensor from the second operating mode into the first operating mode, and the kiosk-mounted display to discontinue the second operating mode and enter the first operating mode, and the kiosk-mounted display according to the first operating mode;

(e) registering a menu order choice selected from the user without contact by interacting with the first preset detection volume in the first mode and the second preset detection volume in the second mode;

(f) accepting payment for the menu order choice from the user; and (g) managing preparation of the order choice.

19. The method according to claim 18, wherein the interactive electronic device comprises a switch which further comprises a graphic representation, the method further comprising:

determining whether a projection of the first position of the user interaction element on the plane comprising the screen surface is included in the graphic representation of the switch at least for a preset period;

if so, performing the switching of the interactive electronic device to the second operating mode;

while in the second operating mode, using a camera or sensor to determine a position of the user interaction element in a second preset detection volume, a projected surface corresponding to the orthogonal projection of the second preset detection volume on the plane comprising the surface of the screen surface; and determining at least one of: speed or acceleration, of the user interaction element.

20. The method according to claim 18, further comprising displaying a distance determined between the user interaction element and the surface of the screen surface as a circle of variable diameter around a cursor, the diameter being proportional to the determined distance, and the graphical interface being displayed on the screen surface of the kiosk-mounted display.

21. A method of controlling an interactive electronic device, the interactive electronic device comprising a kiosk-mounted display displaying a graphical interface on a screen surface, the method comprising:

(a) contactlessly determining a position of a user interaction element in:

(i) a first preset detection volume according to a first operating mode, wherein a height of the first detection volume is adapted to a wheelchair user and a first projected surface corresponding to a first orthogonal projection of the first preset detection volume in a plane and offset from the screen surface, and the first projected surface not covering entirely the screen surface, or (ii) a second preset detection volume according to a second operating mode, wherein a height of the second preset detection volume is adapted to a standing user, and a second projected surface corresponding to a second orthogonal projection of the second preset detection volume in the plane and the second projected surface including at least the screen surface, said second preset detection volume different than the first preset detection volume;

(b) controlling the interactive electronic device according to the first position of the user interaction element according to the first operating mode or the second operating mode;

(c) displaying a restaurant menu;

(d) differently determining the position of the user interaction element in the first preset detection volume or in the second preset detection volume according to the operating mode selected by the user;

(e) controlling the interactive electronic device according to the determined position;

(f) switching from a first operating mode into a second operating mode and discontinuing the first operating mode, or from a second operating mode into a first operating mode and discontinuing the second operating mode, (i) in the first operating mode, a camera or a sensor determining a first position of the user interaction element in a first preset detection volume that has a first projected surface corresponding to a first orthogonal projection of the first preset detection volume onto a plane comprising but offset from the screen surface, wherein the first projected surface does not entirely cover the screen surface, the first preset detection volume comprising a switch position;

(ii) in the second operating mode, the camera or sensor determining a second position of the user interaction element in a second preset detection volume that has a second projected surface corresponding to a second orthogonal projection of the second preset detection volume in the plane, the second projected surface being different than the first projected surface and including the screen surface, the second preset detection volume comprising the switch position;

(g) operating:

(i) the kiosk-mounted display according to the first operating mode, in response to the user interaction element being in the switch position, switching a camera or a sensor from the first operating mode into the second operating mode, the kiosk-mounted display to discontinue the first operating mode and enter the second operating mode, and the kiosk-mounted display according to the second operating mode;

or (ii) the kiosk-mounted display according to the second operating mode, in response to the user interaction element being in the switch position, switching the camera or the sensor from the second operating mode into the first operating mode, the kiosk-mounted display to discontinue the second operating mode and enter the first operating mode, and the kiosk-mounted display according to the first operating mode;

(h) registering a menu order choice selected from the user without contact;

(i) accepting payment for the order choice from the user; and (j) managing preparation of the order choice.

\* \* \* \* \*